(12) United States Patent
Edmonds

(10) Patent No.: US 7,819,724 B2
(45) Date of Patent: Oct. 26, 2010

(54) DEVICE TO HOLD AND GUIDE A HAND-HELD TOOL FOR GRINDING OR CUTTING

(75) Inventor: Larry Edmonds, La Crescenta, CA (US)

(73) Assignee: California Institute of Technology, Pasadena, CA (US)

( * ) Notice: Subject to any disclaimer, the term of this patent is extended or adjusted under 35 U.S.C. 154(b) by 273 days.

(21) Appl. No.: 12/114,372

(22) Filed: May 2, 2008

(65) Prior Publication Data

US 2009/0071312 A1    Mar. 19, 2009

Related U.S. Application Data

(60) Provisional application No. 60/927,707, filed on May 4, 2007.

(51) Int. Cl.
*B24B 41/00*    (2006.01)
*B26D 1/01*    (2006.01)

(52) U.S. Cl. .................. 451/342; 83/829; 451/343; 451/358; 451/359

(58) Field of Classification Search ............. 83/829; 451/342, 343, 358, 359
See application file for complete search history.

(56) References Cited

U.S. PATENT DOCUMENTS 5,980,366 A * 11/1999 Waddle et al. ............. 451/262
6,217,428 B1 * 4/2001 Paisar ........................ 451/365
6,276,990 B1 * 8/2001 Greenland .................. 451/11

\* cited by examiner

*Primary Examiner*—Timothy V Eley
(74) *Attorney, Agent, or Firm*—Steinfl & Bruno

(57) ABSTRACT

A device for securing and guiding a hand-held tool.

9 Claims, 4 Drawing Sheets

U.S. 7,819,724 B2

DEVICE TO HOLD AND GUIDE A HAND-HELD TOOL FOR GRINDING OR CUTTING

PRIORITY CLAIM

This application claims the benefit of U.S. Provisional Application No. 60/927,707, filed 4 May 2007.

GOVERNMENT INTEREST

The invention claimed herein was made in the performance of work under a NASA contract, and is subject to the provisions of Public Law 96-517 (35 USC 202) in which the Contractor has elected to retain title.

FIELD

Embodiments of the present invention relate to hobby tools, and more particularly to a device to secure and guide a hand-held tool for cutting or grinding.

BACKGROUND

A typical hobbyist often does not have available tools for precise cutting, grinding, or shaping of metal parts due to the relatively large expense of machine shop tools. Some hobbyists make use of angle grinders and chop saws to make cuts and to grind various materials. An angle grinder may be difficult to hold steady, and may be difficult to move in a precise way. Furthermore, the work piece may be difficult to view because the view angle for providing the clearest view may result in sparks being thrown at the user's face. Traditionally, a chop saw has only one type of motion, namely a pivotal-type motion. Because of this limitation in, when cutting through thick material, the work piece may eventually conform to the shape of the chop saw blade, thereby producing a relatively large contact area between the blade and work piece. This large contact area may results in a substantial reduction in cutting efficiency before the cut has been completed, and may contribute to excessive local heating.

DESCRIPTION OF EMBODIMENTS

In the description that follows, the scope of the term "some embodiments" is not to be so limited as to mean more than one embodiment, but rather, the scope may include one embodiment, more than one embodiment, or perhaps all embodiments.

Figure 1:
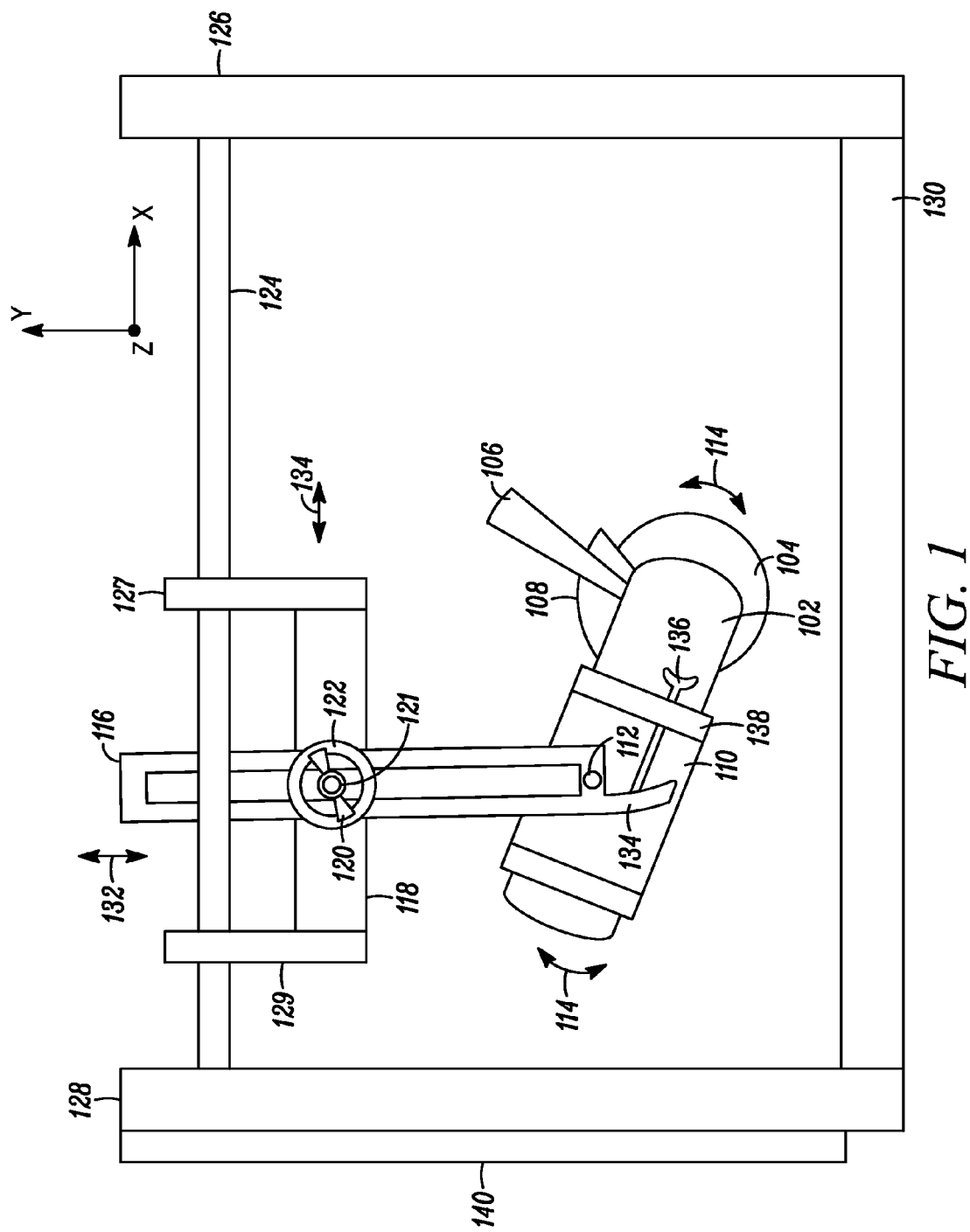
FIG. 1 illustrates a device for securing and guiding a hand-held grinding or cutting tool according to an embodiment.

FIG. 1 is a plan view illustrating a device to hold and guide tool 102 according to an embodiment. In the particular embodiment of FIG. 1, tool 102 is a commercial hand-held angle grinder or cutting tool, with abrasive or cutting wheel 104, handle 106, and guard 108. However, embodiments are not limited to angle grinders, so that tool 102 may be any of a number of tools. For ease of illustration, FIG. 1 is a simplified plan view which is not drawn to scale; and not all components that may be found in a typical embodiment are illustrated so as not to obscure the components illustrated in FIG. 1. The other components not shown in FIG. 1 will be discussed with respect to other illustrations.

So that the view of FIG. 1 may be compared to the views of the other illustrations, a right-handed coordinate system is illustrated in FIG. 1, where the x-axis and y-axis lie in the plane of illustration, and the z-axis is perpendicular to the plane of illustration, pointing out of the page and towards the reader. As will be described below, the device illustrated in FIG. 1 allows tool 102 to be guided along the horizontal (x-axis) direction, and allows for height adjustment of tool 102 in the vertical (y-axis) direction.

Tool 102 is held securely in place by tool holder 110. For some embodiments, tool holder 110 may comprise two or more pieces clamped tightly around tool 102 by tightening screws. Pivot member 112 allows tool holder 110, and therefore tool 102, to pivot about a pivot axis as indicated by arrows 114. The pivot axis is parallel to the z-axis. For some embodiments, pivot member 112 is stationary with respect to tool holder 110. For example, pivot member 112 may be a short cylinder physically attached to tool holder 110. For such an embodiment, pivot member 112 rotates freely within a hole drilled in vertical adjustment arm 116. For some embodiments, pivot member 112 may be stationary with respect to vertical adjustment arm 116. For example, pivot member 112 may be a cylindrical member physically attached to vertical adjustment arm 116 and engaged with a hole formed in tool holder 110.

Vertical adjustment arm 116 includes a protrusion (or jog) 134. Screw 136 is threaded through a member of tool holder 110, labeled 138, with an end resting on protrusion 134. Member 138 may be a lip formed on holder 110, or it may be a separate component attached to tool holder 110. Member 138 has a threaded hole to receive screw 136. The center of gravity of the combination of tool holder 110 and tool 102 is such that, if screw 136 were removed, tool 102 would start to pivot clockwise about the pivot axis. The combination of screw 136 and protrusion 134 acts as a stop, so that the vertical position of tool 102 may be set. For example, if screw 136 were a right-handed threaded screw, then turning screw 136 clockwise increases the length of screw 136 between member 138 and protrusion 134, thereby lifting up tool 102 so that wheel 104 is moved to a higher vertical position. Similarly, turning screw 136 counterclockwise decreases the length of screw 136 between member 138 protrusion 134, thereby letting tool 102 fall such that wheel 104 is brought closer to platform 130. This may be viewed as a fine vertical adjustment of tool 102. Vertical adjustment arm 116 comes into play to provide coarse vertical adjustment of tool 102. This will be discussed later.

Vertical adjustment arm 116 is supported by support member 118. As shown in FIG. 1, vertical adjustment arm 116 has a slot so that it may be tightened against support member 118 by tightening wing nut 120. Wing nut 120 is threaded about bolt 121. A hole (not shown) in support member 118 receives bolt 121. For the particular embodiment of FIG. 1, there is another support member hidden behind support member 118, where this hidden support member receives an end of bolt 121. This hidden support member will be described later. Tightening wing nut 120 about bolt 121 causes washer 122 to press vertical adjustment arm 116 tightly against support member 118. Support member 118 is attached to support member arms 127 and 129. Support member arms 127 and 129 have holes through which rail 124 is inserted, so that tool holder 110, and consequently tool 102, may be moved along the horizontal direction by sliding support member arms 127 and 129 along rail 124. This horizontal movement is indicated by arrow 134. Rail 124 is supported by rail support members 126 and 128, which in turn are attached to platform 130.

Figure 2:
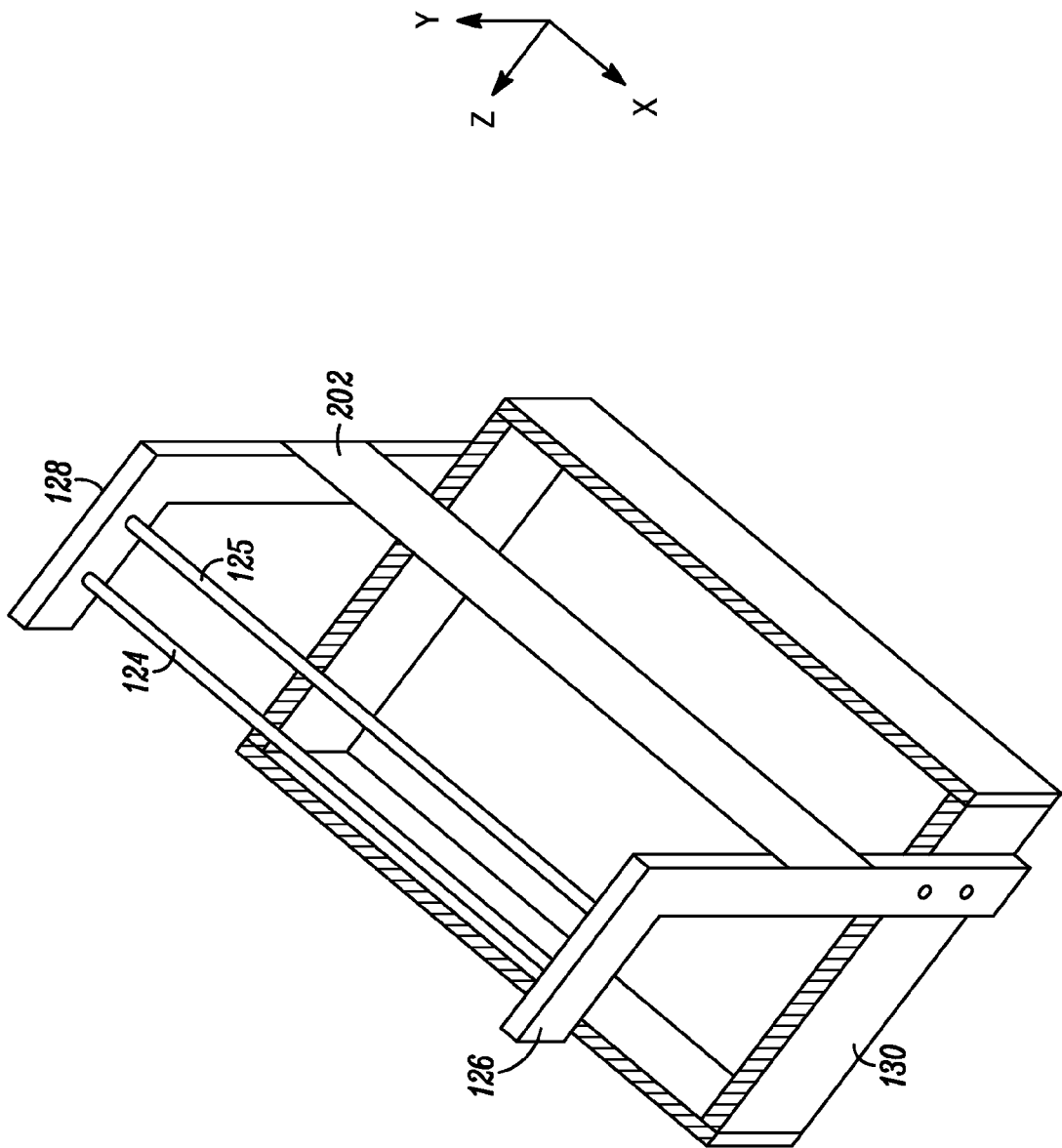
FIG. 2 illustrates a perspective view of some of the components in the device of FIG. 1 according to an embodiment.

Relative to the plan view illustrated in FIG. 1, another rail is behind rail 124. This is illustrated in FIG. 2, showing a perspective view of the device of FIG. 1. However, for ease of illustration, most components in FIG. 1 are not shown in FIG. 2. The top edge of platform 130 is shaded to distinguish it from the other components in FIG. 2. As seen in FIG. 2, in addition to rail 124, rail 125 is supported by rail support members 126 and 128. Support member arms 127 and 129 in FIG. 1 also comprise holes to receive rail 125. Although it may not be readily apparent from the perspective illustrated in FIG. 2, for the embodiment in FIG. 1 and FIG. 2, rails 124 and 125 are positioned so that they are approximately above the center of platform 130. For the embodiment illustrated in FIG. 2, support bar 202 helps stabilize rail support members 126 and 128. However, other embodiments may employ different structures for stabilizing rail support members 126 and 128. (For ease of illustration, support bar 202 was not shown in FIG. 1.)

Figure 3:
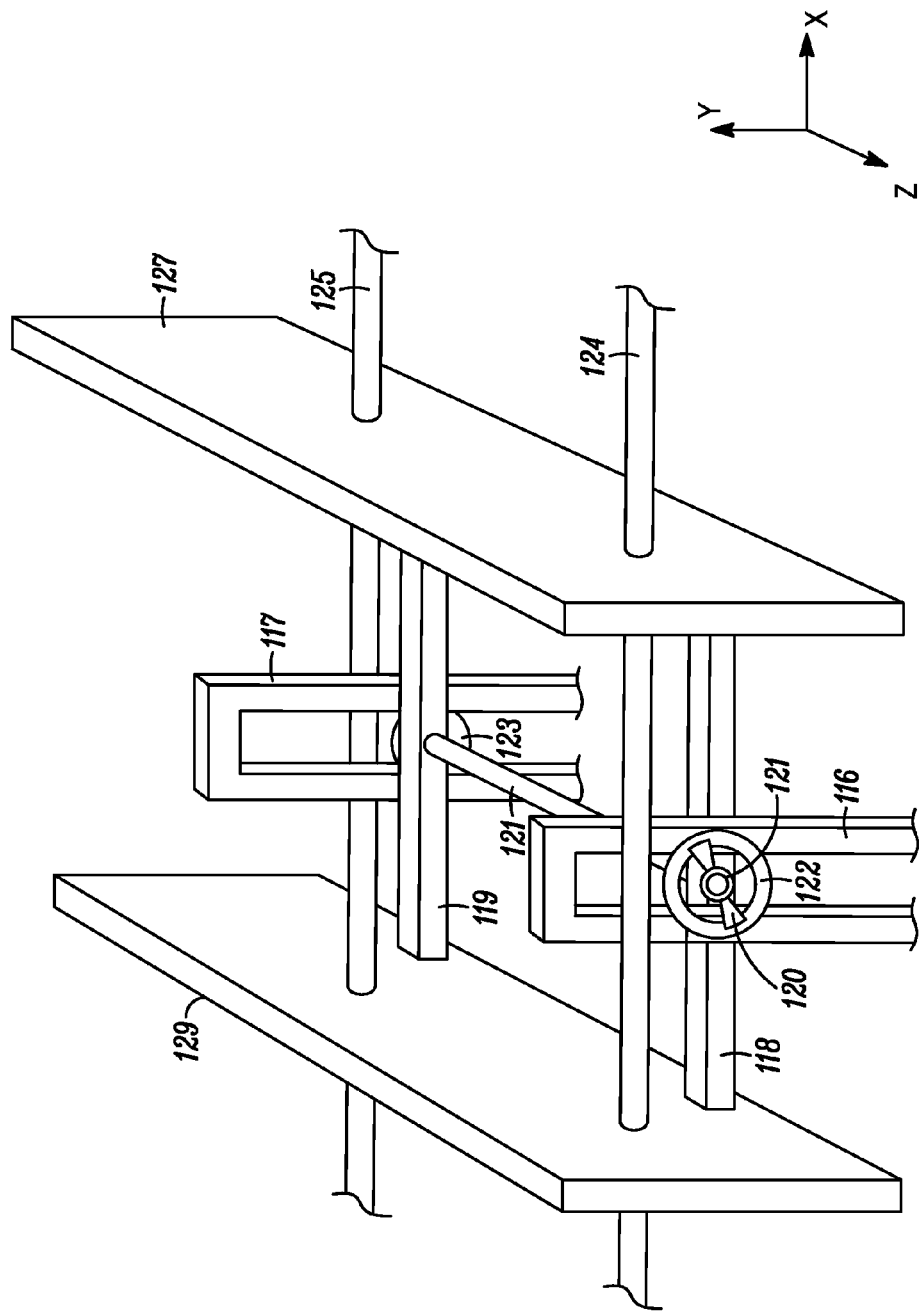
FIG. 3 illustrates a perspective view of some of the components of the device of FIG. 1 according to an embodiment.

Just as rail 125 is hidden behind rail 124 in the plan view of FIG. 1, another vertical adjustment arm is hidden behind vertical adjustment arm 116. This hidden vertical adjustment arm also includes a slot, and as discussed earlier, there is another support member hidden behind support member 118. These complements are illustrated in FIG. 3, where FIG. 3 provides a perspective view of rails 124 and 125, support member arms 127 and 129, support member 118, wing nut 120 and washer 122, and vertical adjustment arm 116. Also shown in FIG. 3 are some of the components hidden in the plan view of FIG. 1, such as vertical adjustment arm 117, support member 119, and washer 123. Furthermore, FIG. 1 illustrates bolt 121 received by a hole (not shown) in support member 119. For ease of illustration, only a portion of these components are shown in FIG. 3.

Tightening wing nut 120 causes washer 122 to hold vertical adjustment arm 116 against support member 118, as described earlier, and also causes washer 123 to hold vertical adjustment arm 117 against support member 119. Loosening wing nut 120 allows for the vertical adjustment of vertical adjustment arms 116 and 117, as indicated by arrow 132 in FIG. 1. In practice, when tool 102 is adjusted close to its desired height, wing nut 120 may be tightened again to secure vertical adjustment arms 116 and 117 against support members 118 and 119, respectively.

Movement of vertical adjustment arms 116 and 117 may be viewed as a course vertical adjustment to the position of tool 102. Turning screw 136 clockwise or counterclockwise provides a fine vertical adjustment to the position of tool 102, as discussed previously.

Referring to FIG. 1, spark backstop 140 is attached to the left end of the device to catch sparks that may be emitted when using tool 102 to cut metal. So as not to clutter the illustration, spark backstop 140 is not shown in FIG. 2. Some embodiments may not employ spark backstop 140, or for some embodiments, spark backstop 140 may be attached to the device so that it may be easily removed if desired.

Figure 4:
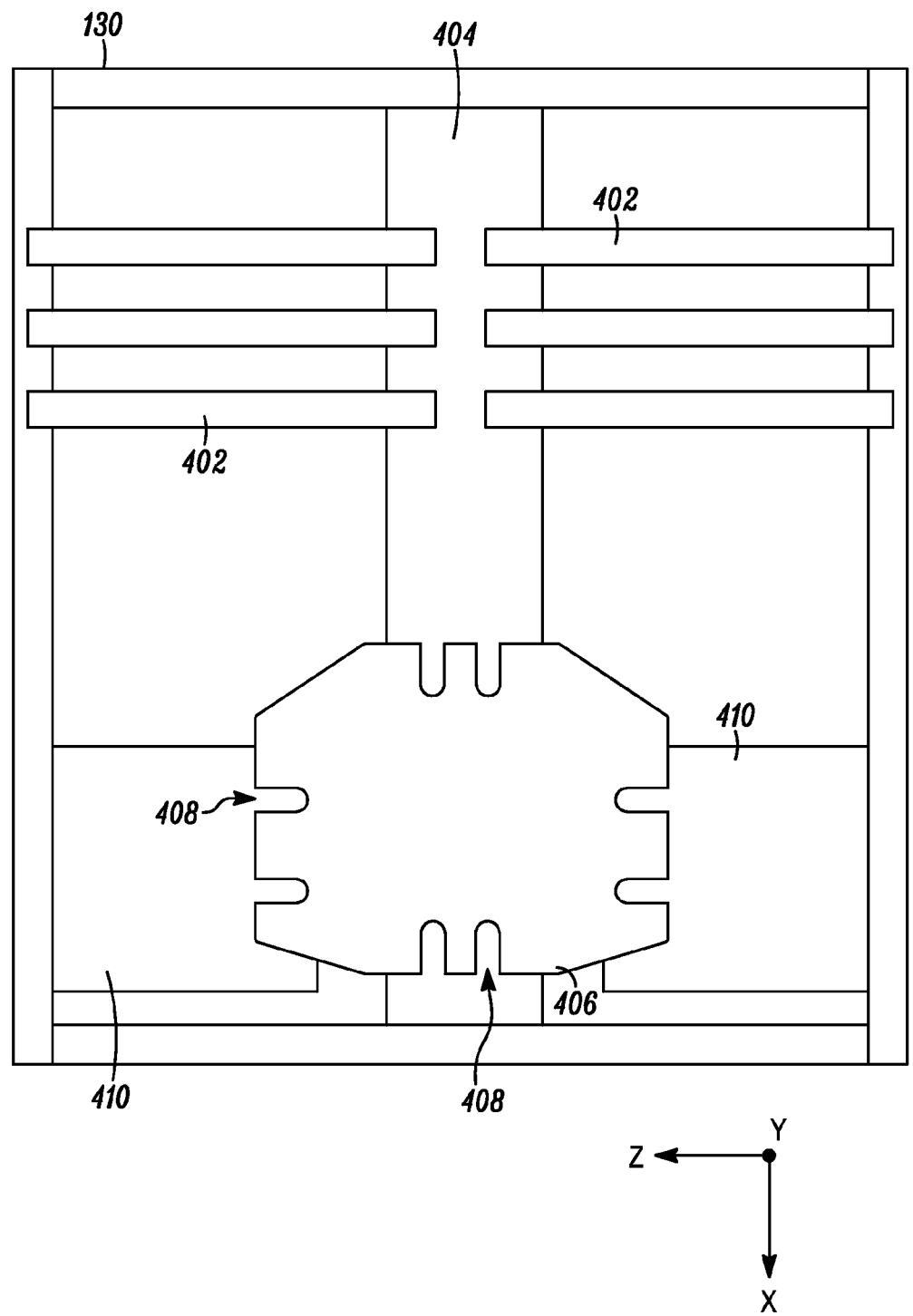
FIG. 4 illustrates a plan view of some of the components of the device of FIG. 1 according to an embodiment.

Formed on platform 130 is a table on which the object to be cut or grinded may be supported. This table is not shown in FIG. 1 and FIG. 2 so as not to obscure those illustrations, but is illustrated in the embodiment of FIG. 4. FIG. 4 is a plan view of some of the components of the device, when looking down from the position above platform 130. In the particular embodiment of FIG. 4, slats 402 are attached to the top edges of platform 130, and to table support member 404, where table support member 404 runs in the x-axis direction and is attached to the ends of platform 130. The illustration in FIG. 4 does not show the other components of the device, such as rail support members 126 and 128, rails 124 and 125, as well as tool 102 and the structure that supports and guides tool 102. However, when an object is placed on slats 402, the thickness of these slats is such that the object is a above table support member 404, and because the ends of these slats do not touch each other so as to form a cutting channel, there is room for wheel 104 to cut or grind the object without damaging the table structure provided by the combination of slats 402 and table support member 404 attached to platform 130. Additional tools, such as vise clamps, may be attached to slats 402 to clamp down an object so that it may be secured when cutting or grinding. In practice, the number of slats used in an embodiment may differ from the number of slats shown in FIG. 4.

The particular embodiment of FIG. 4 illustrates plate 406 with various slots 408 that may be positioned over table support members 410 by the use of bolts and washers inserted through slots 408 and threaded into receiving slots in table support members 410. For ease illustration, these bolts, washers, and receiving slots are not shown in FIG. 4. For some embodiments, the receiving slots in table support members 410 may be aligned along the x-axis direction. Plate 406 may hold a commercial vise. Such a vise may hold an object in various positions allowing a high degree of flexibility in orienting an object relative to tool 102. Plate 406 may be removed to make room for large work pieces that may be held secure against slats 402.

Additional components may be utilized in an embodiment, such as lighting fixtures attached to the device of FIG. 1, or perhaps an electrical outlet strip to plug in tool 102. However, such components are not shown in the Figures so as not to obscure the illustrations.

The various component parts described in the embodiments may be manufactured in various ways, and may be made out of various materials, such as for example metal, plastic, wood products, or various combinations thereof, but are not necessarily limited to such materials. A component part as described above may be formed as a single component of the device, or a component part may be a composite structure comprising multiple sub-components. An embodiment may be sold as a kit to be assembled by the consumer.

It is to be understood that the illustrations described herein are not drawn to scale. Various modifications may be made to the disclosed embodiments without departing from the scope of the invention as claimed below. For example, support members 118 and 119 may be fabricated as a single piece of material, such as metal. As another example, fastening devices other than a wing nut may be used to secure vertical adjustment arms 116 and 117. Similarly, screw 136 may be of various types of screws. As another example, for some embodiments support member arms 127 and 129 may be supported by rails 124 and 125 and may slide along rails 124 and 125 by engaging in recessed tracks within rails 124 and 125. As another example, some embodiments may use a single rail in place of rails 124 and 125.

What is claimed is:

1. An article of manufacture comprising:
   a platform;
   first and second rail support members attached to the platform;
   at least one rail attached to the first and second rail support members;

first and second support member arms, each support member arm supported by the at least one rail so as to slide along the at least one rail;
a first support member attached to the first and second support member arms;
a first vertical adjustment arm comprising a slot, and comprising a protrusion;
a fastening device to secure the first vertical adjustment arm against the first support member;
a first pivot member in contact with the first vertical adjustment arm;
a tool holder in contact with the first pivot member to pivot about the first pivot member; and
a screw, the tool holder including a threaded hole for receiving the screw, the screw including an end for coming into contact with the protrusion of the first vertical adjustment arm so as to adjust the height of the tool holder with respect to the platform.

2. The article of manufacture as set forth in claim 1, wherein the first pivot member is attached to the first vertical adjustment arm.

3. The article of manufacture as set forth in claim 2, the tool holder including a hole to receive the first pivot member.

4. The article of manufacture as set forth in claim 1, wherein the first pivot member is attached to the tool holder.

5. The article of manufacture as set forth in claim 4, the first vertical adjustment arm further comprising a hole for receiving the first pivot member.

6. The article of manufacture as set forth in claim 1, further comprising:
a second vertical adjustment arm comprising a slot, the fastening device securing the second vertical adjustment arm against the first support member; and
a second pivot member in contact with the second vertical adjustment arm, wherein the tool holder is in contact with the second pivot member to pivot about the second pivot member.

7. The article of manufacture as set forth in claim 1, further comprising:
a second vertical adjustment arm comprising a slot;
a second support member attached to the first and second support member arms, the fastening device securing the second vertical adjustment arm against the second support member; and
a second pivot member in contact with the second vertical adjustment arm, wherein the tool holder is in contact with the second pivot member to pivot about the second pivot member.

8. The article of manufacture as set forth in claim 1, the at least one rail comprising a first rail and a second rail, wherein the first support member comprises a first hole to receive the first rail, and a second hole to receive the second rail; and wherein the second support member comprises a first hole to receive the first rail, and a second hole to receive the second rail.

9. The article of manufacture as set forth in claim 1, further comprising:
an angle grinding tool held by the tool holder.

* * * * *